United States Patent [19]

Steinmann

[11] 3,748,559

[45] July 24, 1973

[54] SPEED CONTROL ARRANGEMENT FOR DC MOTORS

[75] Inventor: Helmut Steinmann, Baden-Baden, Germany

[73] Assignee: Robert Bosch G.m.b.H., Stuggart, Germany

[22] Filed: Jan. 31, 1972

[21] Appl. No.: 222,219

[30] Foreign Application Priority Data

Feb. 3, 1971 Germany .................. P 21 04 895.3

[52] U.S. Cl. .............................................. 318/341
[51] Int. Cl. ............................................. H02p 5/16
[58] Field of Search ..................... 318/331, 341, 345

[56] References Cited
UNITED STATES PATENTS

| | | | |
|---|---|---|---|
| 3,617,845 | 11/1971 | McKenna | 318/341 |
| 3,351,148 | 11/1967 | Solomon | 318/341 |
| 3,001,114 | 9/1961 | Hermann | 318/341 |
| 3,184,672 | 5/1965 | Mason | 318/345 |
| 3,629,677 | 12/1971 | Means | 318/341 |

Primary Examiner—Bernard A. Gilheany
Assistant Examiner—Thomas Langer
Attorney—Michael S. Striker

[57] ABSTRACT

An arrangement for controlling the speeds of DC motors, in which a first transistor is connected in series with the motor and supplies current for driving the motor. The operational state of the first transistor is controlled by a second complementary transistor. An adjustable resistor sets the base current for the second controlling transistor. The two transistors form a switching circuit in conjunction with a feedback resistor, so that switching takes place as a function of the voltage appearing across a capacitor connected in parallel with the motor. Inductance between the motor and the first transistor functions together with the capacitor as a smoothing circuit.

14 Claims, 2 Drawing Figures

3,748,559

SPEED CONTROL ARRANGEMENT FOR DC MOTORS

BACKGROUND OF THE INVENTION

The present invention relates to a control circuit for speed control or regulation of a DC motor in a continuous or stepless manner. A main transistor supplies current to the motor, and a second transistor controls the main transistor in a manner based on the feature that the two transistors are complementary from the viewpoint of conductivity type. An adjustable resistor serves to set the base voltage for the transistor controlling the main transistor for the motor current.

Control circuits are known in the art in which the internal resistances of the main transistor and the controlling transistor become continuously varied with the aid of adjustable resistors, so that any desired motor current can be applied. A particular disadvantage of this method of motor control, is that when the motor is driven at less than full load, the main transistor possesses a substantially relatively high internal resistance. Since, under such partial load conditions, the transistor must, nevertheless still conduct a considerable amount of current for driving the partial load, the resulting power losses can attain significant magnitudes. The main transistor must thereby, be overdesigned from the viewpoint of power carrying capacity. For the purpose of improving upon this feature, circuits often referred to as pulse-control circuits have been applied for the purpose of driving the motor in an intermittent manner, rather than apply continuous current to the motor. For such pulse-control circuits, a considerable amount of complex circuitry is generally required. The conventional pulse-control circuits require greater complexity and equipment than the control circuits which operate on a continuous basis.

In the use of small DC motors having power capacities up to a few 100 watts, a further condition must be taken into account. With pulse-control circuits, the current to the motor is applied with a pulse repetition frequency of several Hz to several kHz. The smaller the moment of inertia of the motor armature, the more noticeable is the abrupt forward motion of the armature due to the influence of the current pulses. When using small motors, thereby, a chattering or whistling may be heard depending upon the pulse repetition frequency being used. The individual core laminations of the armature are also set into oscillation, so that when using such pulse-control circuits of conventional design for small DC motors, considerably louder noise is incurred in operation, than when using a continuously operating control circuit.

SUMMARY OF THE INVENTION

It is an object of the present invention to provide a control circuit for operating a DC motor at regulated speed through a main transistor conducting current to the motor, so that the transistor may be designed on the basis of substantially small power losses to be incurred.

It is also an object of the present invention to provide a speed control arrangement for DC motors, as set forth, which is no more complex than control circuits for continuous control methods.

It is a further object of the present invention to provide a speed control arrangement for DC motors, of the foregoing character, which do not incur greater noise levels in operation than incurred with continuous control methods.

A still further object of the present invention is to provide a speed control arrangement for DC motors which may be readily fabricated and assembled.

Another object of the present invention is to provide a speed control arrangement for DC motors which is reliable in operation and may be economically maintained.

The objects of the present invention are achieved by providing a storage capacitor in parallel with a motor. A storage inductance is, furthermore, connected in series with the motor winding, and the main transistor for conducting current through the motor is connected to the controlling transistor so as to form a switching circuit in conjunction with a feedback resistor, which may be switched dependent upon the voltage prevailing across the storage capacitor.

In accordance with the present invention the required storage inductance can be omitted when, in one embodiment of the invention, a series DC motor is used. In this application of a series DC motor, the field winding of the motor serves as the storage inductance, so that the insertion of a inductor for this purpose may be omitted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
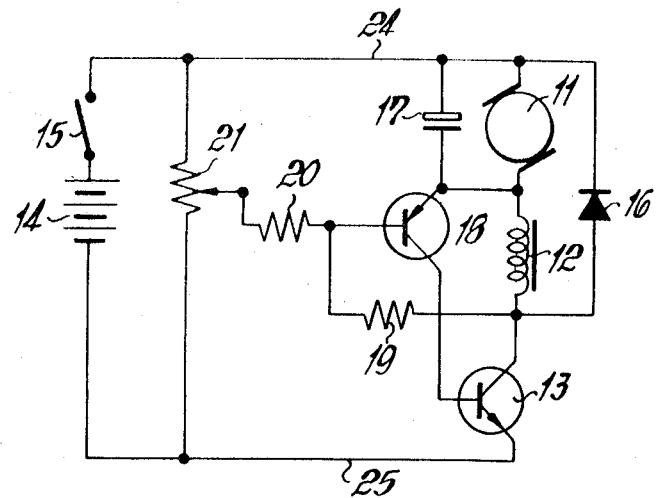
FIG. 1 is a circuit diagram of one embodiment of the present invention for controlling the speed of a DC motor, and shows the essential components and their interconnections, in accordance with the present invention.

Referring to the drawing, a DC motor 11 is powered or supplied with energy by a source of battery 14. The negative terminal of this battery is connected to a negative voltage supply line 25, and the positive terminal of this battery is connected to a main switch 15 which, in turn, is connected to a positive supply line 24. The first terminal of the DC motor 11 is connected directly to the positive voltage supply line 24, whereas the second terminal 26 of this DC motor 11 is connected, through a storage coil or inductor 12 and an electronic switch, here a transistor 13, to the negative voltage supply line 25. Connected in parallel to the series circuit of the DC motor 11 and the storage coil 12 is a diode 16. A storage capacitor 17, furthermore, is connected directly in parallel with the DC motor 11.

A second transistor 18 has its reference electrode or emitter connected directly to the terminal 26 of the DC motor. The conductivity type of this second transistor 18 is opposite to the conductivity type of the transistor 13 which serves as the main transistor in the circuitry. The output electrode or collector of the transistor 18 is directly connected to the base of the transistor 13.

The control electrode or base of the transistor 18, furthermore, is connected, on the one hand, to one terminal of a resistor 20 which leads to the sliding contact of a potentiometer 21. The base of the transistor 18 also leads, on the other hand, to a feedback resistor 19 which is, in turn, directly connected to the collector of the main transistor 13.

Figure 2:
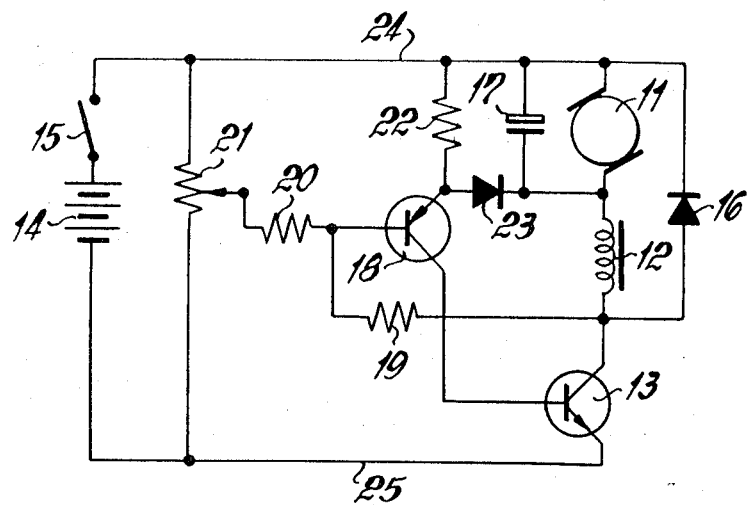
FIG. 2 is a circuit diagram of another embodiment of the speed control arrangement of FIG. 1.

The second embodiment shown in FIG. 2 differs from the first embodiment shown in FIG. 1, in that the emitter of the transistor 18 is connected to the terminal 26 of the DC motor, through a diode 23. A resistor 22 moreover, is connected between the emitter of this transistor 18, and the positive voltage supply line 24. All other components are arranged identical to that of the first embodiment and are designated with the same reference numerals.

It will be seen below that components 12, 13 and 16–22 together constitute an astable circuit means and that components 16–22 in particular constitute charging-discharging circuit means for the timing capacitor 17 of the astable circuit means.

A feature in the functional operation of the first embodiment, is that the storage coil 12 has applied to it a pulse-shaped signal corresponding to a pulsed DC voltage. The DC motor 11, however, has applied to it only a substantially non-wavy DC voltage, because the storage coil 12 and the storage capacitor 17 serve as smoothing means. The chattering and whistling noises and sounds of the armature, described above, can thereby not appear. When using series DC motors the complexity of the smoothing means can be substantially reduced. In such series DC motors, the field winding can be used directly as the storage coil.

In the detailed operation of the embodiment of FIG. 1, the main switch 15 is closed. The transistor 18 receives, thereby, base current through the potentiometer 21 and the resistor 20. As a result, the transistor 18 conducts and the transistor 13 also becomes, thereby, conducting. The transistor 13 provides current to the DC motor 11, through the storage coil 12, and charges, at the same time, the storage capacitor 17. As the storage capacitor 17 becomes charged, the base-emitter voltage of the transistor 18 decreases. The internal resistance of the transistor 18, thereby, increases, so that the base current of the transistor 13 also decreases. The voltage drop across the emitter-collector path of the transistor 13, thereby, increases and the collector potential of the transistor 13 is shifted in the positive direction. This positive voltage shift is applied to the base of the transistor 18, through the feedback resistor 19. As a result, the transistor 18 becomes rapidly switched to the non-conducting or turned-off state. The main transistor 13 also becomes thereby fully non-conducting or turned-off, since this transistor 13 no longer receives any base current.

Since the main transistor 13 is turned off, the DC motor 11 can obtain operating current only through the storage capacitor 17 and the storage coil 12, after the transistor 13 has been switched to the non-conducting state. The storage capacitor 17 becomes thereby discharged, so that the base emittor voltage of the transistor 18 becomes again increased. The transistor 18 commences, thereby, to conduct and applies, in turn, base current to the transistor 13. As soon as the transistor 13 conducts, the collector potential drops so that the base potential of the transistor 18 is also shifted into the negative region, and so that this transistor 18 becomes thereby rapidly conducting. The switching times of the transistors are substantially very short, since the two transistors 18 and 13 form an amplifier which is strongly positively feedback coupled through the feedback resistor 19.

The switching of the transistor 13 to the on and off states, is repeated periodically at a frequency which is essentially determined by the capacitance of the storage capacitor 17, and the inductance of the storage coil 12. The ratio of the rise time to the period of the output pulses of the transistor 13, becomes determined through the setting of the potentiometer 21 and the load of the DC motor 11. Through the application of the potentiometer 21, therefore, the speed of the DC motor 11 may be varied in a continuous or stepless manner. The prescribed requirements described above are thereby fulfilled. The two transistors 18 and 13 are very rapidly switched from the conducting to the non-conducting state, in view of the positive feedback coupling through the resistor 19. In this manner, power losses are maintained small in each case. At the same time, the DC motor 11 does not receive a pulse shaped voltage. Instead, the DC voltage applied to the motor has only a small degree of waviness, and as a result the armature noises are not greater than those incurred in a continuously operating control circuit, as described above. The control circuit of the present invention is particularly applied in an advantageous manner to series DC motors, since the field winding of such motors can serve directly as the storage coil 12.

The second embodiment of FIG. 2 allows the power losses of the transistor 13 to be still further substantially reduced. For purposes of understanding the functional operation of the second embodiment, FIG. 1 is still referred to. The voltage drop through the series circuit consisting of the storage coil 12 and the transistor 13 is, at all times, at least equal to the sum of the saturation voltage $U_{CEsat}$ of the collector-emitter path of the transistor 18, and the base emittor voltage of the transistor 13. This voltage drop has a magnitude of substantially 1.5 volts or greater in the first embodiment even when the transistor 13 is in the conducting state. Since the internal resistance of the storage coil 12 is substantially very small, this voltage drop is applied substantially entirely at the collector-emittor path of the transistor 13.

In the second embodiment of FIG. 2, the diode 23 is provided. This diode raises the potential of the emitter of transistor 18 by substantially 0.7 volts above the potential of the second terminal. As a result, the base potential of the transistor 13 is also substantially 0.7 volts higher, and first transistor 13 is made more conductive so that it has a voltage drop which is substantially smaller than 1.5 volts. By using a Darlington circuit including two transistors in the place of the main transistor 13, the functional operation of the second embodiment is optimized. In this case, the diode 23 is replaced by two series-connected diodes, so that the emitter potential of the transistor 18 is shifted by 1.4 volts in relation to the potential prevailing at the second terminal 26. This shifting in potential is toward the positive direction. In place of the two series-connected diodes, furthermore, it is possible to use also a stabilizing diode with a voltage drop of substantially 1.5 volts.

The resistor 22 is required for the purpose to provide current to the diode 23, so that this diode is conductive. In other respects, the functional operation of the control circuit is not changed. The movable contact of the potentiometer 21 must be solely moved toward the positive voltage, in order to compensate for the foward voltage drop of the diode 23.

As evident from the preceding description, the control circuitry, in accordance with the present invention, does not possess any more components or complexity than the conventional continuously operating control circuits. In addition, the armature noises are maintained at a substantially low level. The control circuit of the present invention may be particularly advantageously applied for operating valves in motorized vehicles. It is also possible to install the control circuit of the present invention directly within a regulating circuit. Thus, the potentiometer 21 can be replaced, for example, through the output of a regulating amplifier, and the speed of the DC motor 11 can be controlled as a function of the internal temperature of the motor vehicle. The control circuit of the present invention, is also adaptable to windshield wiping devices. In such applications, however, the potentiometer 21 must be replaced through an adjustable resistor which is settable in increments.

A further advantage of the circuit of the present invention resides in the feature that the main switch 15 can be omitted from the circuit. This feature results from the condition that the two transistors 18 and 13 become completely turned off when the potentiometer 21 has been positioned so that the movable contact is adjacent to the upper terminal of the potentiometer winding. In this setting of the potentiometer, the base of the transistor 18 has positive potential applied to it. The current through the coil of the potentiometer 21 can generally be tolerated in most applications.

It will be understood that each of the elements descried above, or two or more together, may also find a useful application in other types of control arrangements of DC motors, differing from the types described above.

While the invention has been illustrated and described as embodied in control arrangements of DC motors, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement, comprising in combination a D.C. motor having two motor terminals; a source of electrical energy for said motor; and astable circuit means having two states and operative in one state for connecting said source to said motor to effect the flow of electrical energy from said source into said motor, and operative in the other state for disconnecting said source from said motor to terminate the flow of electrical energy from said source into said motor, said astable circuit means comprising an electronic switch connected to said motor for conducting motor current, a timing capacitor connected across said motor terminals, and charging-discharging circuit means connecting said timing capacitor to said electronic switch in such a manner as to alternately render said switch conductive and non-conductive in dependence upon the voltage across said capacitor, and thereby in dependence upon the energy stored in said capacitor, said charging-discharging circuit means being operative when said switch conducts for causing said capacitor to undergo a first change of stored energy whose duration controls the length of time said switch conducts, and operative when said switch does not conduct for causing said capacitor to undergo a second change of stored energy whose duration controls the length of time said switch does not conduct and during which energy stored in said capacitor flows into said motor, whereby said capacitor serves both for smoothing motor operation and also for timing the relative durations of said two states of said astable circuit means, said charging-discharging circuit means further including varying means for selectably varying the relative durations of said two states of said astable circuit means by varying the duration of at least one of said changes of stored energy, to thereby vary motor speed.

2. An arrangement as defined in claim 1, wherein said electronic switch is a transistor.

3. An arrangement as defined in claim 1, and further including a smoothing inductor connected in series with said motor and in series with said electronic switch.

4. An arrangement as defined in claim 1, wherein said motor is a series D. C. motor.

5. An arrangement as defined in claim 1, wherein said electronic switch comprises a first transistor having a control electrode, an output electrode and a reference electrode, and wherein said charging-discharging circuit means comprises a second transistor having a control electrode, an output electrode and a reference electrode, with said second transistor being so connected to said first transistor that the conductivity of said second transistor controls the conductivity of said first transistor.

6. An arrangement as defined in claim 5, wherein the output electrode of said first transistor is connected to the control electrode of said second transistor, and wherein the output electrode of said second transistor is connected to the control electrode of said first transistor.

7. An arrangement as defined in claim 6, wherein said first and second transistors are of opposite conductivity type.

8. An arrangement as defined in claim 7, wherein said varying means comprising adjustable resistor means operative for varying the biasing voltage of said second transistor.

9. An arrangement as defined in claim 7, wherein said varying means comprises a potentiometer whose movable tap is connected to the control electrode of said control electrode of said second transistor, and wherein said timing capacitor is connected between the output electrode of said second transistor and one terminal of said source.

10. An arrangement as defined in claim 6, wherein the output electrode of said second transistor is connected directly to the control electrode of said first transistor, and further wherein a feedback resistor connects the output electrode of said first transistor to the control electrode of said second transistor.

11. An arrangement as defined in claim 10, and further including a smoothing inductor connected between one terminal of said motor and the output electrode of said first transistor, with the refernece electrode of said second transistor being connected to the junction of said one motor terminal and said smoothing inductor.

12. An arrangement as defined in claim 11, and further including a diode connected between the reference electrode of said second transistor and the junction of said smoothing inductor and said one motor terminal.

13. An arrangement for controlling the speed of the DC motor, comprising, in combination, DC motor means; first transistor means connected to said motor means and conducting current for driving said motor means at a predetermined speed; second transistor means connected to said first transistor means for controlling the operational state of said first transistor means; adjustable resistor means connected to said second transistor means for adjusting the base current of said second transistor means; capacitor means connected in parallel with said motor means; inductance means connected in series with said motor means; and feedback resistor means connected between said first transistor means and said second transistor means, said transistor means and said resistor means comprising switching means switchable dependent on the voltage across said capacitor means, and wherein said adjustable resistor means comprises a potentiometer with movable contacts connected to the base of said second transistor means, and further including means for connecting said capacitor means to the emitter of said second transistor means.

14. An arrangement for controlling the speed of the DC motor, comprising, in combination, DC motor means; first transistor means connected to said motor means and conducting current for driving said motor means at a predetermined speed; second transistor means connected to said first transistor means for controlling the operational state of said first transistor means; adjustable resistor means connected to said second transistor means for adjusting the base current of said second transistor means; capacitor means connected in parallel with said motor means; inductance means connected in series with said motor means; and feedback resistor means connected between said first transistor means and said second transistor means, said transistor means and said resistor means comprising switching means switchable dependent on the voltage across said capacitor means, and wherein said inductance means is connected between one terminal of said motor means and the collector of said first transistor means, the emitter of said second transistor means being connected to the junction of said motor means and said inductance means.

* * * * *